US011157490B2

(12) United States Patent
Zhu et al.

(10) Patent No.: US 11,157,490 B2
(45) Date of Patent: Oct. 26, 2021

(54) CONVERSATIONAL VIRTUAL ASSISTANT

(71) Applicant: Microsoft Technology Licensing, LLC, Redmond, WA (US)

(72) Inventors: Chenguang Zhu, Sammamish, WA (US); Weizhu Chen, Kirkland, WA (US); Jianwen Zhang, Sammamish, WA (US); Xuedong Huang, Bellevue, WA (US); Zheng Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 752 days.

(21) Appl. No.: 15/434,891

(22) Filed: Feb. 16, 2017

(65) Prior Publication Data

US 2018/0232376 A1 Aug. 16, 2018

(51) Int. Cl.
*G06F 16/242* (2019.01)
*G06F 16/36* (2019.01)
*G06F 40/35* (2020.01)
*G06F 40/295* (2020.01)

(52) U.S. Cl.
CPC .......... *G06F 16/243* (2019.01); *G06F 16/367* (2019.01); *G06F 40/295* (2020.01); *G06F 40/35* (2020.01)

(58) Field of Classification Search
CPC .............................. G06F 16/243; G06F 16/367
USPC ....................................................... 707/728
See application file for complete search history.

(56) References Cited

U.S. PATENT DOCUMENTS

| 6,829,603 | B1 | 12/2004 | Chai et al. | |
|---|---|---|---|---|
| 7,502,738 | B2 * | 3/2009 | Kennewick | G10L 15/22 704/257 |
| 9,223,537 | B2 | 12/2015 | Brown et al. | |
| 2007/0294229 | A1 * | 12/2007 | Au | G06Q 30/02 |
| 2009/0030800 | A1 | 1/2009 | Grois | |
| 2012/0265528 | A1 * | 10/2012 | Gruber | G10L 15/18 704/235 |

(Continued)

OTHER PUBLICATIONS

"SoundHound Unveils a Voice-Based Virtual Assistant for Android", http://gadgets.ndtv.com/apps/news/soundhound-unveils-a-voice-based-virtual-assistant-for-android-699814, Jun. 4, 2015, 4 pages.

(Continued)

*Primary Examiner* — Joshua Bullock

(57) ABSTRACT

Conversational virtual assistance for delivering relevant query solutions is provided. A virtual assistant system comprises various components associated with developing a knowledge database that can be searched for finding documents that fulfill the user's intent. The virtual assistant system further comprises components for receiving a query from a user, extracting entities for understanding the user's intent, and for searching a knowledge database for documents responsive to the query. When additional information is needed for determining more relevant results, a conversation strategy is determined, and a question is formulated for generating a conversation with the user for clarifying the user's intent, confirming a solution, or obtaining additional information. The user is enabled to provide a follow-up response that is related to a previously identified entity. The entity is edited in the query, and responses are refined responsive to the edited query.

20 Claims, 15 Drawing Sheets

(56) References Cited

U.S. PATENT DOCUMENTS

| | | | |
|---|---|---|---|
| 2013/0204813 A1 | 8/2013 | Master et al. | |
| 2013/0283168 A1* | 10/2013 | Brown | G06F 3/165 715/728 |
| 2014/0297284 A1 | 10/2014 | Gruber et al. | |
| 2014/0310005 A1* | 10/2014 | Brown | G06F 17/273 704/275 |
| 2014/0365223 A1 | 12/2014 | Brown et al. | |
| 2015/0121216 A1* | 4/2015 | Brown | G06N 3/006 715/707 |
| 2015/0185996 A1* | 7/2015 | Brown | G06F 3/04817 715/706 |
| 2015/0348551 A1* | 12/2015 | Gruber | G06F 17/2705 704/235 |
| 2016/0055843 A1 | 2/2016 | Gupta | |
| 2016/0063097 A1* | 3/2016 | Brown | G06K 9/6254 707/737 |
| 2016/0155445 A1* | 6/2016 | Selfridge | G10L 15/1822 704/249 |
| 2017/0091312 A1* | 3/2017 | Ajmera | G06F 16/3329 |
| 2017/0242860 A1* | 8/2017 | Soughe | G06N 5/043 |
| 2017/0337261 A1* | 11/2017 | Wang | G06F 17/2785 |
| 2018/0225365 A1* | 8/2018 | Altaf | G06F 17/27 |

OTHER PUBLICATIONS

"How Nina Web is used", http://web.archive.org/web/20141112181717/http://www.nuance.com/for-business/customer-service-solutions/nina/nina-web/index.htm, Nov. 12, 2014, 3 pages.

"Enhancing Virtual Agents with Structured Knowledge", https://www.econtext.com/wp-content/uploads/eContext-VA-Whitepaper-July-2016-Enhancing-Virtual-Agents-With-Structured-Knowledge.pdf, Jul. 2016, 1-29 pages.

Wang, et al., "Knowledge Graph and Text Jointly Embedding", "In Proceedings of Conference on Empirical Methods on Natural Language Processing", Oct. 1, 2014, 1591-1601 pages.

* cited by examiner

FIG. 4B

Found some places that you may like. If not, rephrase your question or you can talk to a person.

yes - or mexican and that takes reservations

Mama Rosa's
★★★
123 Main St.
555-555-1234
www.mamarosasweb.com  [See menu]  [See pics]
- Italian cuisine
- Open today
- Outdoor dining
- Free parking
- Takes reservations Bella Sol
★★★★
2244 Broadway St.
555-555-2244
www.bellasolweb.com  [See menu]  [See pics]
- Italian cuisine
- Open today
- Outdoor dining
- Has delivery
- Takes reservations Abuela Emilia
★★★★
369 Main St.
555-555-3691
www.abuelaem.com  [See menu]  [See pics]
- Mexican cuisine
- Open today
- Outdoor dining
- Takes reservatinos
- Live music on weekends Little Mexico — 302
★★★★
852 West Ave.
555-555-8520
www.littlemex.com  [See menu]  [See pics]
- Mexican cuisine
- Open today
- Outdoor dining
- Good for groups
- Takes reservations

[See more Italian options]  [See more Mexican options]  [See other options]

CONVERSATIONAL VIRTUAL ASSISTANT

BACKGROUND

Virtual assistants are increasingly being utilized for helping individuals to complete everyday tasks. Generally, in order to complete a task, a virtual assistant receives a request from a user, determines the user's intent, and generates relevant solutions to the user's request. Sometimes virtual assistants can be ineffective due to a variety of issues. For example, the user's request can be ambiguous, incomplete, or the user does not structure the request correctly. Accordingly, the virtual assistant may not be able to understand the user's intent. Oftentimes the virtual assistant will deliver solutions that do not fulfill the need of the user. The user may then rephrase the request hoping for a relevant solution or may give up. As can be appreciated, this can be inefficient and frustrating to the user.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a device, method, and computer-readable medium for improving the functionality of a virtual assistant system by applying a conversation strategy to a user query to engage the user for gathering information needed to fulfill the query, and thus to deliver a relevant solution to the user. For example, aspects of the virtual assistant system provide for asking the user for clarification or for more information for matching the user's request with entities identified in candidate solutions or for asking for confirmation to clarify the user's intent. Further, aspects provide for enabling the user to provide follow-up responses for commenting on the result or for providing additional or edited query information. In response to receiving edited query information, the virtual assistant system is able to revise the query with the edited information and identify relevant solutions that are responsive to the edited query. The functionality of the user's device is improved by the present disclosure in at least that an improved user experience is provided that enables the user to efficiently receive a relevant solution without having to repeat a query when editing query data.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings:

FIGS. 4A-C are illustrations of another example communication between a virtual assistant and a user;

DETAILED DESCRIPTION

Figure 1:
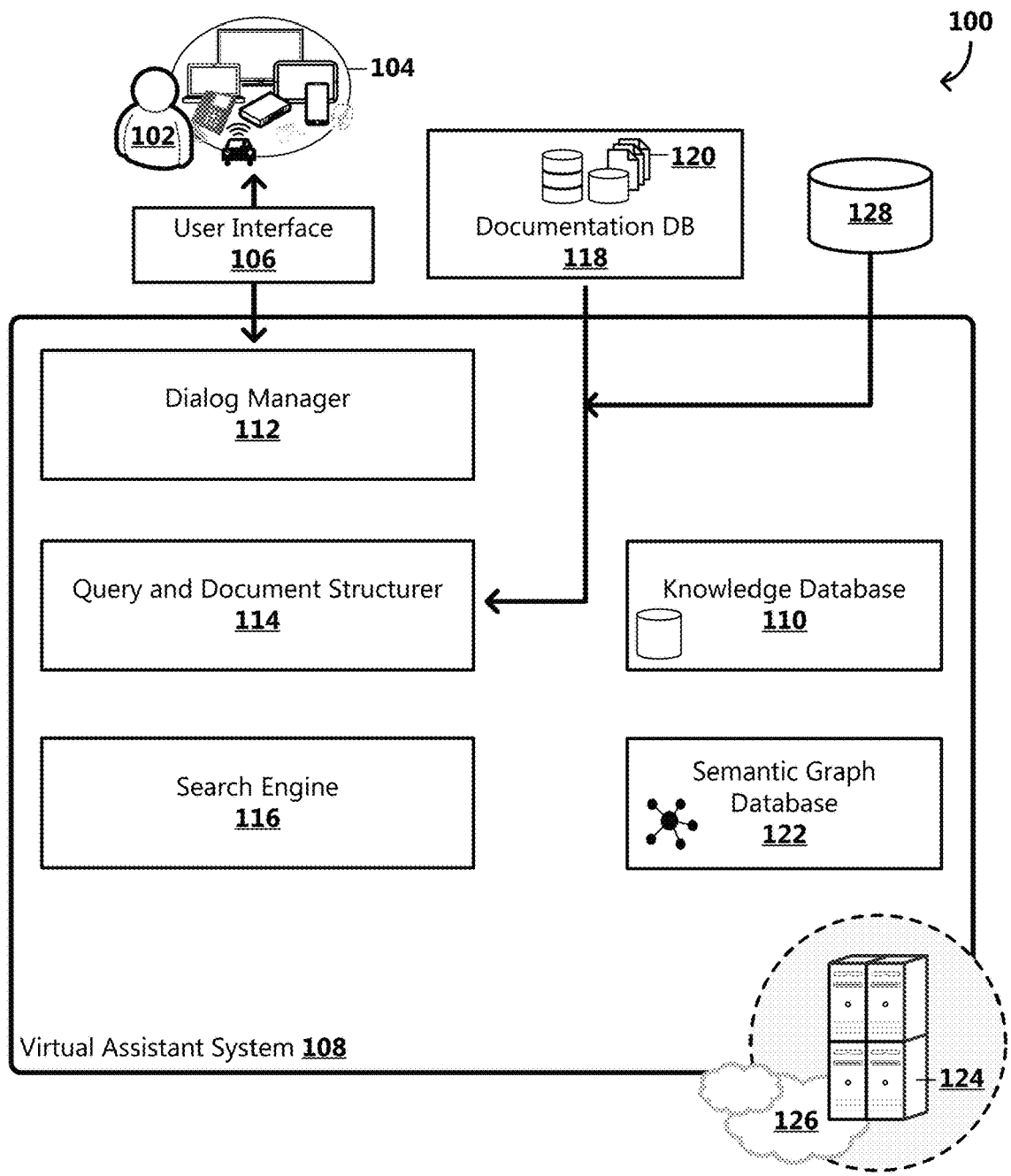
FIG. 1 is a block diagram illustrating an example environment including components of a virtual assistant system for providing conversational virtual assistance for delivering relevant query solutions.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a device, method, and computer-readable medium for providing conversational virtual assistance for providing relevant query solutions. FIG. 1 illustrates a block diagram of a representation of a computing environment 100 in which conversational virtual assistance may be implemented. As illustrated, the example environment 100 includes a virtual assistant system 108. According to an aspect, the virtual assistant system 108 comprises various components associated with receiving a query from a user 102 and understanding the user's intent, developing a knowledge database 110 that can be searched for finding documents that fulfill the user's intent, and determining and formulating a conversation strategy for generating a conversation with the user 102 for clarifying the user's intent, confirming a solution, or obtaining additional information from the user 102 for obtaining more relevant solutions.

According to examples, a user 102 is enabled to utilize a computing device 104 to communicate with the virtual assistant system 108. For example, the computing device 104 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device).

In some examples, the virtual assistant system 108 is executed locally on the computing device 104. In other examples, the virtual assistant system 108 is executed on a remote computing device or server computer 124 and communicatively attached to the computing device 104 through a network 126 or a combination of networks, which include, for example and without limitation, a wide area network (e.g., the Internet), a local area network, a private network, a public network, a packet network, a circuit-switched network, a wired network, and/or a wireless network. According to an example, the user 102 accesses a remote virtual assistant system 108 via a user agent executing locally on the computing device 104. The hardware of these computing devices is discussed in greater detail in regard to FIGS. 6, 7A, 7B, and 8. In some examples, a user 102 may utilize a phone, and the network is a phone system.

In some examples, the communication channel via which a user 102 communicates with the virtual assistant system 108 employs a user interface (UI 106) associated with the virtual assistant system 108 by which the user 102 can submit a query and by which responses to the query, conversation dialog, or other information may be delivered to the user 102. For example, the user 102 may submit questions, requests, commands, feedback, or other input. In examples, the UI 106 is configured to receive user inputs in the form of audio messages or text messages, and deliver virtual assistant system responses to the user 102 in the form of audio messages or displayable messages. In one example, the UI 106 is implemented as a widget employed to or integrated with a software application, a mobile application, a website, or a web service to provide a computer-human interface for acquiring user requests and delivering virtual assistant system outputs to the user 102.

According to an example, when input is received via an audio message, the input may comprise user speech that is captured by a microphone of the computing device 104. Other input methods are possible and are within the scope of the present disclosure. For example, the computing device 104 is operative to receive input from the user 102, such as text input, drawing input, inking input, selection input, etc., via various input methods, such as those relying on mice, keyboards, and remote controls, as well as Natural User Interface (NUI) methods, which enable a user 102 to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

According to examples, the query submitted by the user 102 is an unstructured query, such as a natural language query comprised of normal terms in the user's language, without any special syntax or format. For example, the user 102 is enabled to enter terms in a variety of forms, including a statement, a question, or a list of keywords. According to an aspect, the virtual assistant system 108 comprises a dialog manager 112, illustrative of a software module, system, or device, operative to receive the natural language query input via the communication channel, and enable a multi-turn discussion or conversation with the user 102. In some examples, such as when the user 102 is communicating via an audio message, a telephone call, video, or voice conference, the dialog manager 112 includes or is operatively connected to a speech-to-text and text-to-speech component.

The virtual assistant system 108 further comprises a query and document structurer 114, illustrative of a software module, system, or device, operative to ground the query and documents 120 to a knowledge graph 122. In one example, the query and document structurer 114 is operative to mine various collections of data and perform machine learning techniques on the various collections of data for analyzing and extracting entities from unstructured text. For example, an entity may be a person, an account, an object, a product, a component, an event, an action, a task, an issue, or other type of matter that can be identified and tracked.

The various collections of data can include one or a plurality of documentation databases 118 or other content sources 128 that store a corpus of documents 120. As used herein, the term "documents" defines an electronic textual record and can represent various types of data items. According to some examples, the query and document structurer 114 processes the corpus of documents 120 for extracting strings and converting the strings to vectors. For example, titles, URLs (Uniform Resource Locators), and key snippets (e.g., a portion of a document) are extracted from documents 120, and are mapped to vectors, wherein the query and document structurer 114 is trained so that similar strings are mapped to similar vectors. In some examples, the query and document structurer 114 may include or be in communication with a synonyms service or a language understanding model for ensuring a single relationship is used to represent relationships that can be expressed in different ways.

In some examples, the query and document structurer 114 utilizes semantic linking techniques to convert the unstructured natural language queries and unstructured documents into a defined structured format using a deep neural network to identify entities in the query and accurately capture relations between entities. Consider for example, receiving a query "how to burn a disc in Operating System X?" and processing a document 120 titled "Burning a Disc in Operating System X10." Entities extracted from the query may include "Operating System X," and entities extracted from the document title may include "Operating System X" and "Operating System X10," which is a child entity of "Operating System X."

In other examples, natural language processing is used to extract a list of strings denoting key talking points in the corpus of documents 120 being analyzed. For example, natural language processing may be used to extract a title, snippet, problem description, answers marked by editors from raw HTML (HyperText Markup Language) pages of documents 120. In another example, keywords, topics, categories, and entities can be extracted, and relationships and degrees of similarity can be computed using the query and document structurer 114. For example, in a document 120 titled "Solutions to Blue Screen Problem," extracted entities may include "blue screen." Using a knowledge database 110 illustrative of a repository operative to store the structured documents, extracted entities, and corresponding vectors, an inference can be made that "blue screen" is an entity that belongs to "Operating System X" domain. Therefore, the document 120 is attached in an entity list: blue screen/ Operating System X. If the query also contains the entity "Operating System X" or entities related to "Operating System X," the confidence score indicative of the similarity between the query and the document 120 would be higher.

The query and document structurer 114 is further operative to process a received unstructured query for interpreting the user's intent. According to examples, the query and document structurer 114 is operative to analyze the text in the query, structure the query, identify and extract entities, and map identified entities to vectors. According to an aspect, the virtual assistant system 108 comprises or is operatively connected to a search engine 116, illustrative of a software module, system, or device, operative to perform a search of the knowledge database 110 for mapping vectors corresponding to identified entities in the structured query to vectors of identified entities from the corpus of documents 120. For example, mapping vectors between entities in the query and entities in a document 120 is based at least in part on a calculated degree of similarity between the vectors. In some examples, the mapping is based on cosign similarity.

For example, each document 120 is partitioned into a source and a target. In some examples, the target is the title of the document 120. The source can be of various forms. In one example, the source is a query on a search engine 116 issued by a user 102 who later clicks the link to the document 120. In another example, the source is a problem description part of the document 120. In another example, the source is the problem description of a page whose link appears in an answer part of a clicked page. According to an aspect, the query and sources or targets are converted by deep learning modules into a compact numeric vector. The query and document structurer 114 then searches for the top K most similar source vectors to the query vector using cosine similarity, and then selects the top N most similar target vectors among the ones associated with the K source vectors. The corresponding N documents are then returned as retrieval results.

According to an aspect, the virtual assistant system 108 comprises or is operatively connected to a semantic graph database or knowledge graph 122, wherein the knowledge graph 122 is a relational graph used to represent entities as nodes, and attributes and relationships between the nodes as edges, thus providing a structured schematic of entities and their properties. According to examples, edges between nodes can represent an inferred relationship or an explicit relationship. According to examples, the knowledge graph 122 can include a set of properties accompanying nodes (representative of entities). Each property can be considered a key/value pair—a name of the property and its value. According to an aspect, one or more components of the virtual assistant system 108 are operative to query the knowledge graph 122 to learn about the relationships between entities for providing more relevant results to the user 102.

Figure 2A:
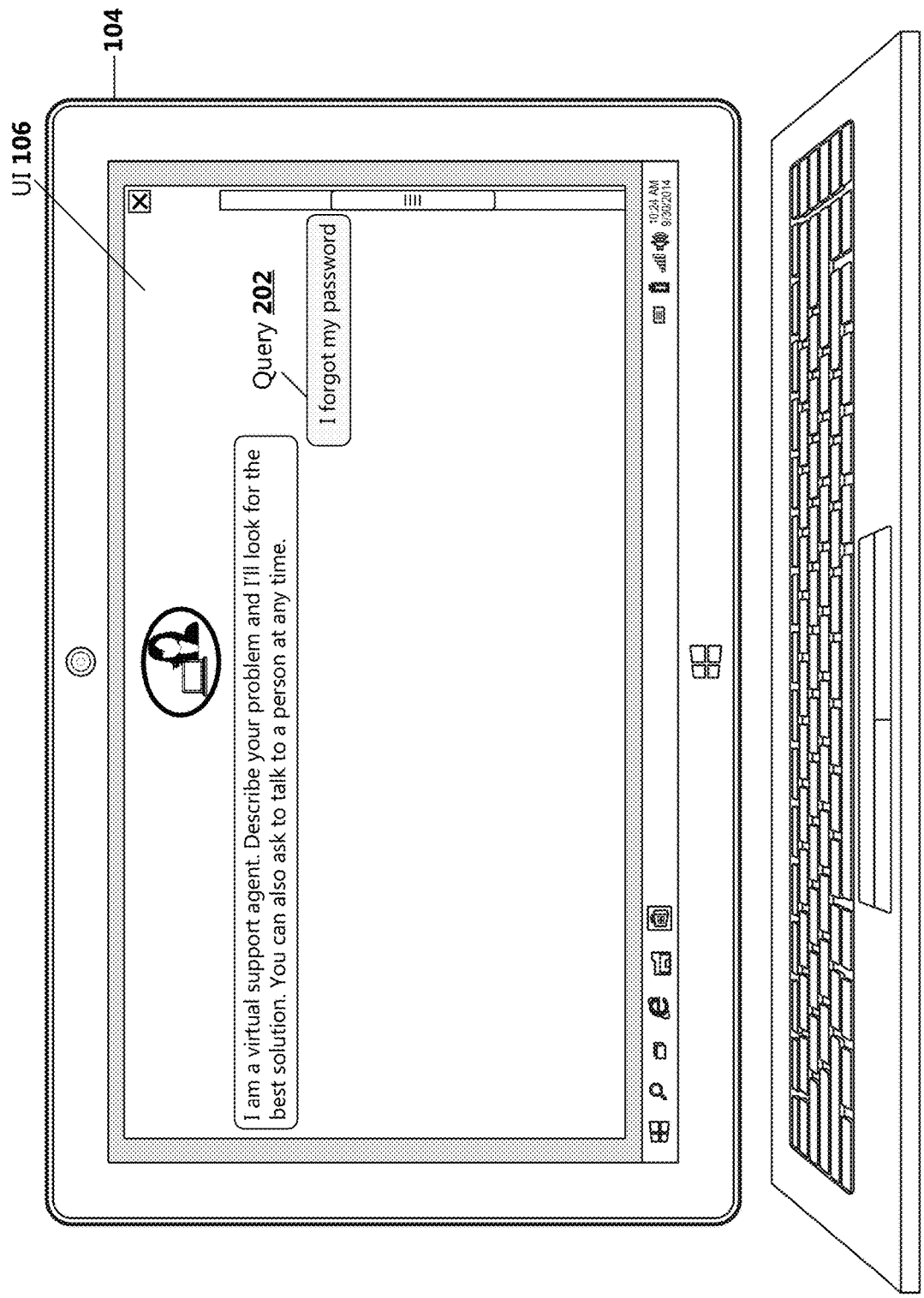
FIGS. 2A-C are illustrations of an example scenario for applying a conversation strategy to a query for delivering relevant query solutions.
Figure 2B:
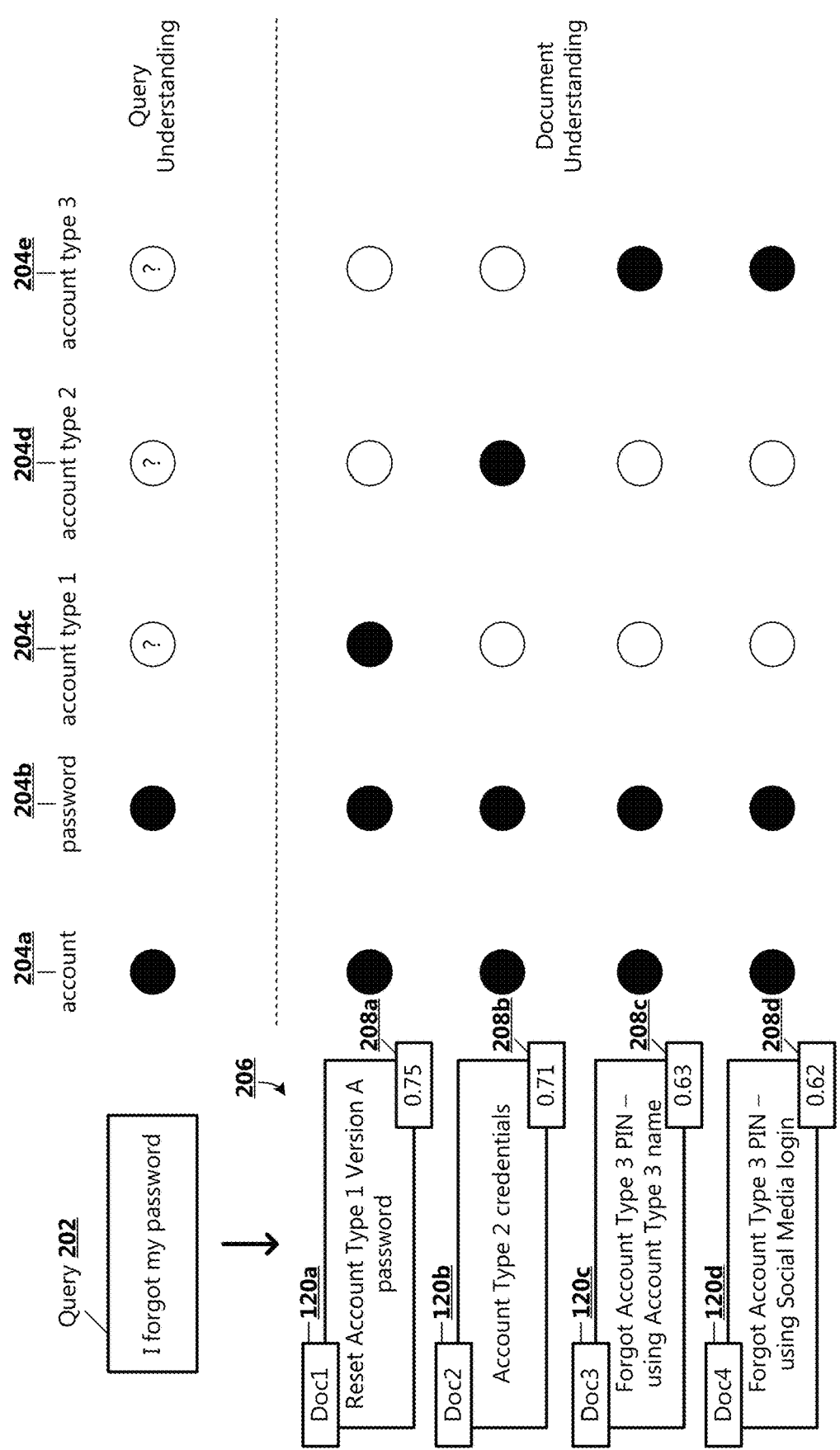

Consider for example and with reference now to FIG. 2A that a user 102 sends a query 202: "I forgot my password" to the virtual assistant system 108 by typing the query into a UI 106 associated with the virtual assistant system 108. With reference now to FIG. 2B, the dialog manager 112 receives the query 202, and the query and document structurer 114 processes the query for converting the query into a structured format. Further, the query and document structurer 114 identifies and extracts entities 204*a,b* from the query 202 for mapping against entities 204*a-e* identified and extracted from various documents 120. For example, the search engine 116 searches the knowledge database 110 for at least portions of structured documents 120 that match or are related to the entities 204*a,b* extracted from the query 202, and generates a candidate pool 206 including search results having matching entities. As illustrated in FIG. 2B, the search results include four relevant documents 120*a-d*. For example, entities 204*a,b* "account" and "password" or entities related to "account" and "password" were identified and extracted from snippets or titles of the documents, and the entities match the entities identified and extracted from the query 202. In the example, the four relevant documents 120*a-d* are related to account type 1, account type 2, and account type 3, respectively, and the search results have confidence scores 208 that satisfy a certain threshold value. A corresponding confidence score 208*a-d* is provided with each search result, wherein a confidence score 208 indicates a level of confidence that the result satisfies or represents the query. According to an aspect, documents 120 with confidence scores 208 that do not satisfy a certain threshold are filtered out of the candidate pool 206. In some examples, the threshold is a predetermined value. In other examples, the threshold is determined based on a variance between confidence scores 208. For example, there may be a gap between one set of confidence scores 208 and another set of confidence scores 208. Accordingly, the threshold may be determined based on the gap or variance between the sets.

According to an aspect, the dialog manager 112 is further operative to analyze the candidate pool 206 for determining whether to apply a conversation strategy for filtering the search results for providing more relevant solutions to the user 102. For example, according to one aspect, the dialog manager 112 analyzes entities 204 identified and extracted from the documents 120*a-d* that are missing in the query 202. According to an example, the dialog manager 112 is operative to formulate a question 210 to ask the user 102 to clarify whether the entity 204 in the document 120 matches the user's intent. Based on the user's response 212, the dialog manager 112 is further operative to adjust the confidence score 208 of each document 120 until the candidate pool 206 is comprised of documents having confidence scores 208 satisfying a certain threshold value.

Figure 2C:
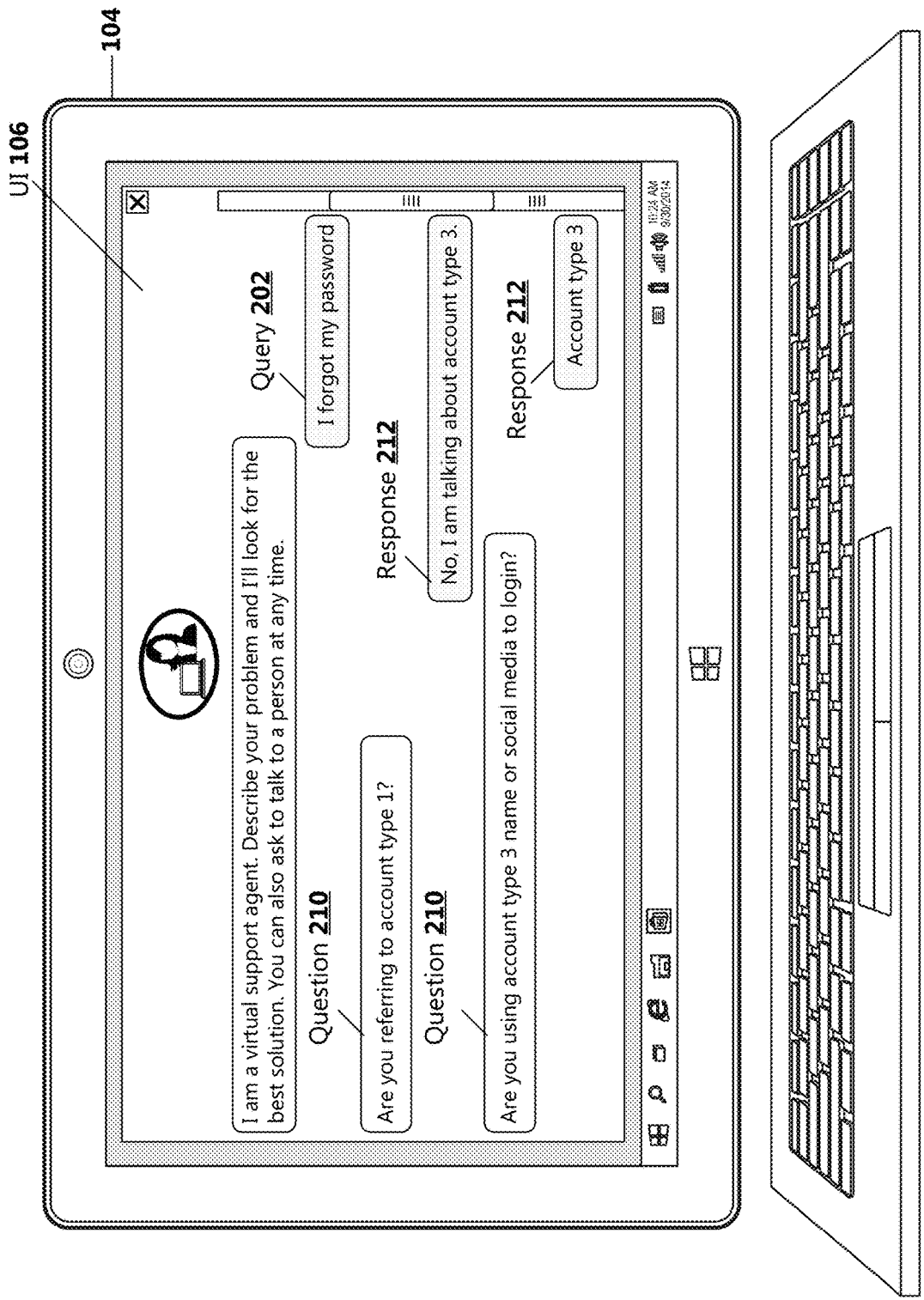

In the example illustrated in FIG. 2B, the first document 120*a* includes or is related to entity 204*c* "account type 1;" the second document 120*b* includes or is related to entity 204*d* "account type 2;" and the third and fourth documents 120*c,d* include or are related to entity 204*e* "account type 3." According to one example, the dialog manager 112 starts with a question relating to an entity 204 that is associated with a generally-median number of search results for optimizing a split difference of the candidate pool 206. For example, the dialog manager 112 can use a binary search algorithm starting at the middle of the range, and then continuing to divide the sample space in half to minimize the number of questions and responses. According to another example, the dialog manager 112 starts with a question relating to the search result having the highest confidence score 208. For example and as illustrated in FIG. 2C, the dialog manager 112 formulates the question 210, "Are you referring to account type 1?" If the user 102 provides a response 212 with, "No, I am talking about account type 3," then entity 204*e* in the query is satisfied, and the dialog manager 112 is operative to filter out document 1 120*a* and document 2 120*b*, and the confidence scores 208 of document 3 120*c* and document 4 120*d* are incremented. In some examples, the dialog manager 112 may present a plurality of search results to the user 102, wherein the number of results may be limited to a predetermined threshold. In other examples, the dialog manager 112 may formulate another question 210 for clarification, such as, "Are you using account type 3 name or social media to login?" Based on the user's response 212, the candidate pool 206 can be filtered to one result determined to be a most relevant document 120 responsive to the query 202, and which can be delivered to the user 102.

According to another aspect, when analyzing the candidate pool 206 for determining whether to apply a conversation strategy for filtering the search results for providing more relevant solutions to the user 102, the dialog manager 112 is operative to determine whether the user's intent is clearly understood. For example and with reference again to FIG. 2B, the dialog manager 112 may use a paraphrasing strategy (paraphrasing content of a search result) to ask the user 102, "Did you mean resetting Account Type 1 Version A password?" Based on the user's response 212, the dialog manager 112 is further operative to adjust the confidence score 208 of each document 120 until the candidate pool 206 is comprised of documents 120 having confidence scores 208 satisfying a certain threshold value. According to an aspect, when the candidate pool 206 is comprised of a multiple search results, the dialog manager 112 is operative to group similar results together, and deliver a representative results from each group to the user 102, asking the user 102 for confirmation.

In some examples, aspects of the virtual assistant system 108 are further operative to concatenate all input provided by the user 102 in a given conversation with the virtual assistant system 108 into a single string and perform a search of the knowledge database 110 based on the single string. For example, the concatenated string provides a holistic context, and the search is performed based on the holistic context rather than individual vectors corresponding to individual communications sent by the user 102.

According to examples, aspects provide for enabling the user 102 to continue a conversation after a result or solution is delivered. For example, the user 102 is enabled to provide a follow-up response, wherein the follow-up response can be a comment about the result or can include additional query information. Upon receiving a follow-up response, the dialog manager 112 is operative to determine whether the user's intent is to get new results. According to an example, the determination is based at least in part on whether the follow-up response includes an edit to an entity 204 in the set of identified attributes in the structured query 202. When a determination is made that the follow-up response includes an edit to an entity 204, the dialog manager 112 is operative to edit the entity 204 in the structured query 202, and keep the other entities 204 unedited. For example, the user 102 does not have to start the query 202 over, but can simply provide a follow-up response that the dialog manager is 112 able to identify as an entity 204 to edit, and to edit the appropriate entity 204 for providing the user 102 with a relevant solution.

Figure 3A:
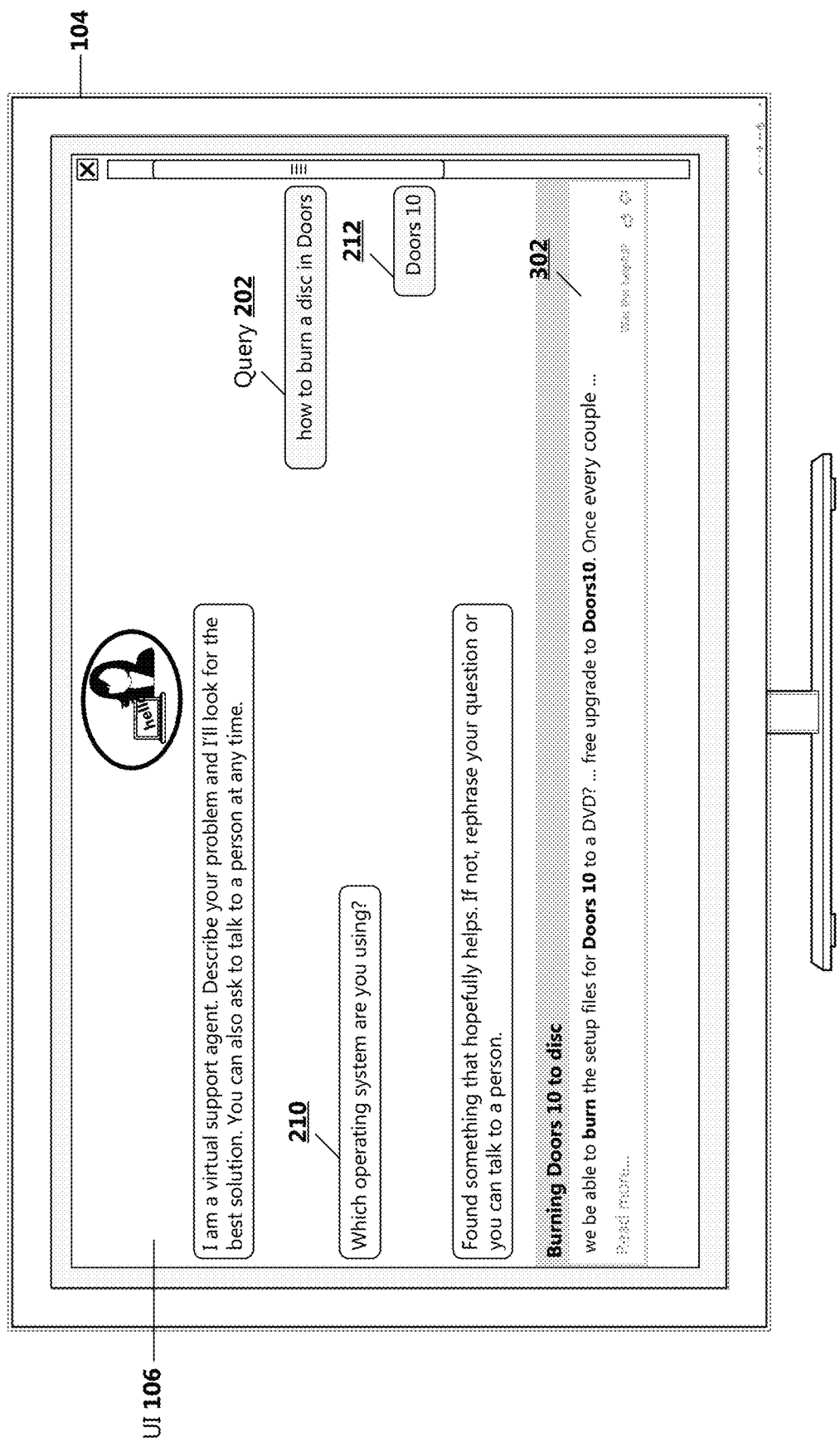
FIGS. 3A-B are illustrations of an example communication between a virtual assistant and a user.
Figure 3B:
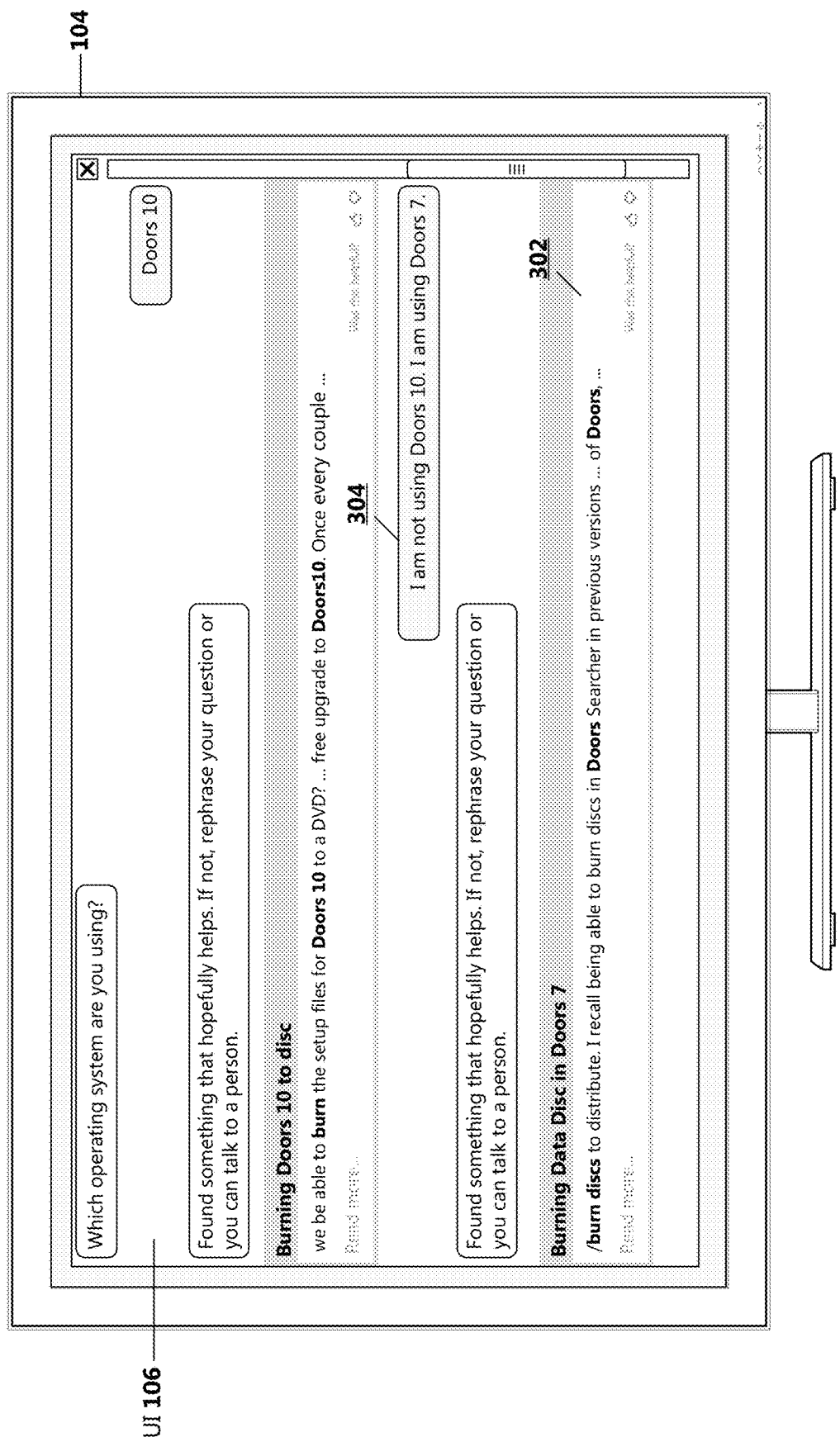

FIGS. 3A-3B illustrate an example of a user 102 providing a follow-up response. With reference now to FIG. 3A, the user 102 provides a query 202 "How to burn a disc in Doors." Responsive to receiving the query 202, the virtual assistant system 108 structures the query 202, determines the user's intent, and searches the knowledge database 110 for search results. Upon making a determination that more information is needed, the dialog manager 112 determines a conversation strategy and formulates and provides a question 210 to the user 102, asking the user 102 "Which operating system are you using?" The user 202 provides a response 212, "Doors 10." For example, the response 212 may fulfill a missing entity 304 in the structured query, and based on the user's response, the dialog manager 112 is able to filter the results 302 to one or more relevant documents 120 meeting a certain threshold, and deliver the results 302 to the user 102. With reference now to FIG. 3B, the user 102 provides a follow-up response 304 "I am not using Doors 10. I am using Doors 7." Accordingly, responsive to the follow-up response 304, the dialog manager 112 determines that the follow-up response 304 includes an entity 204 that is an edit to a previously-fulfilled entity 204, and edits the entity 204 in the structured query 202 for determining and providing search results 302 that are responsive to the edited query 202.

Figure 4A:
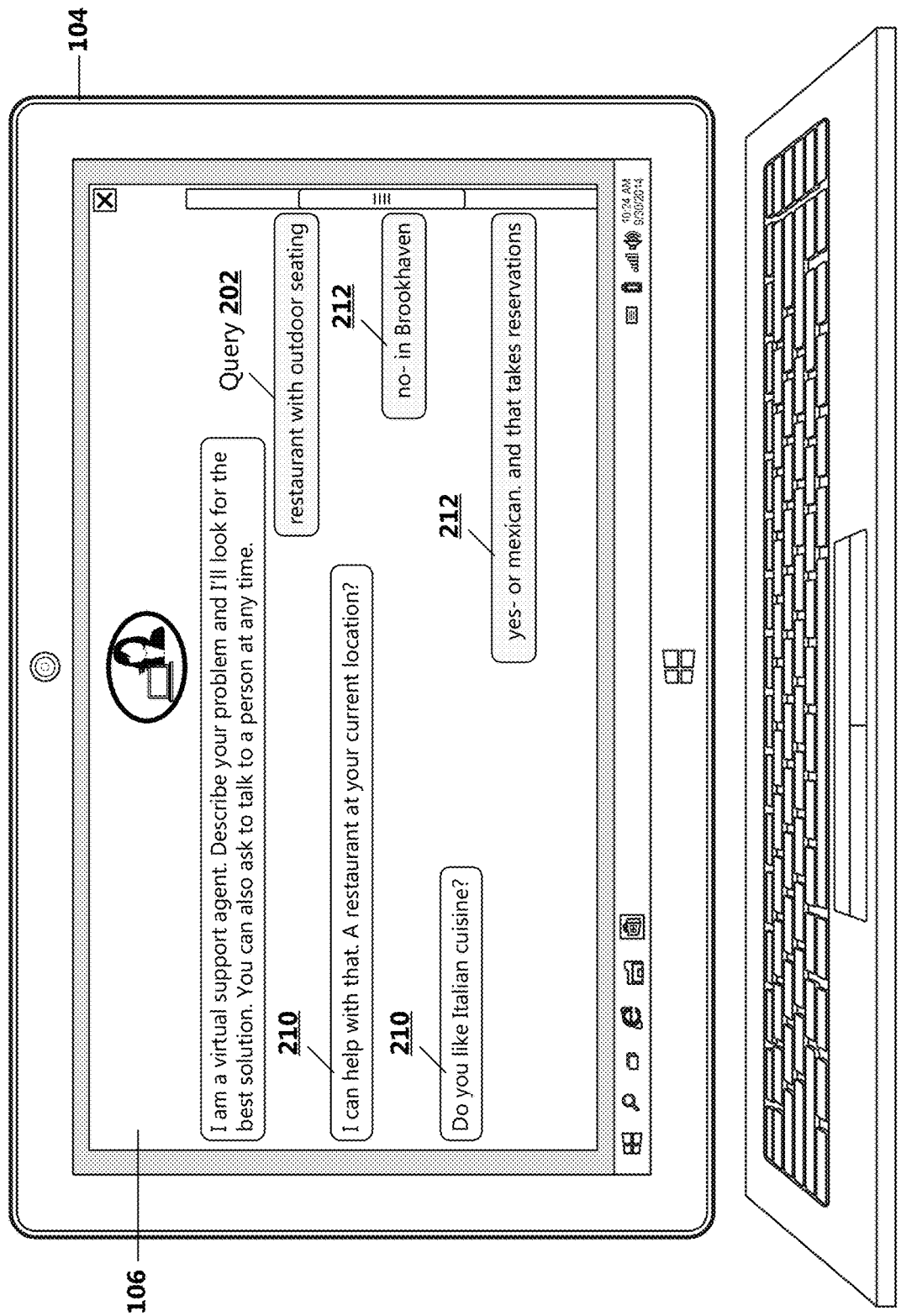

FIGS. 4A and 4B illustrate an example use case where the user 102 is searching for a restaurant and where the user 102 provides a follow-up response 304 after results 302 are provided. Referring now to FIG. 4A, the user 102 provides a query 202 "restaurant with outdoor seating." Responsive to receiving the query 202, the virtual assistant system 108 structures the query 202, determines the user's intent, and searches the knowledge database 110 for search results. Upon making a determination that more information is needed, the dialog manager 112 determines a conversation strategy and formulates and provides a question 210 to the user 102, asking the user, "A restaurant at your current location?" The user 102 provides a response 212, "no—in Brookhaven." For example, the response 212 may fulfill a missing entity 304 in the structured query 202, and based on the user's response, the dialog manager 112 is able to filter the results to a plurality of relevant documents 120. The dialog manager 112 may make a determination that more information is needed, determines a conversation strategy, and formulates and provides a second question 210 to the user 102, asking the user, "Do you like Italian cuisine?"

Figure 4C:
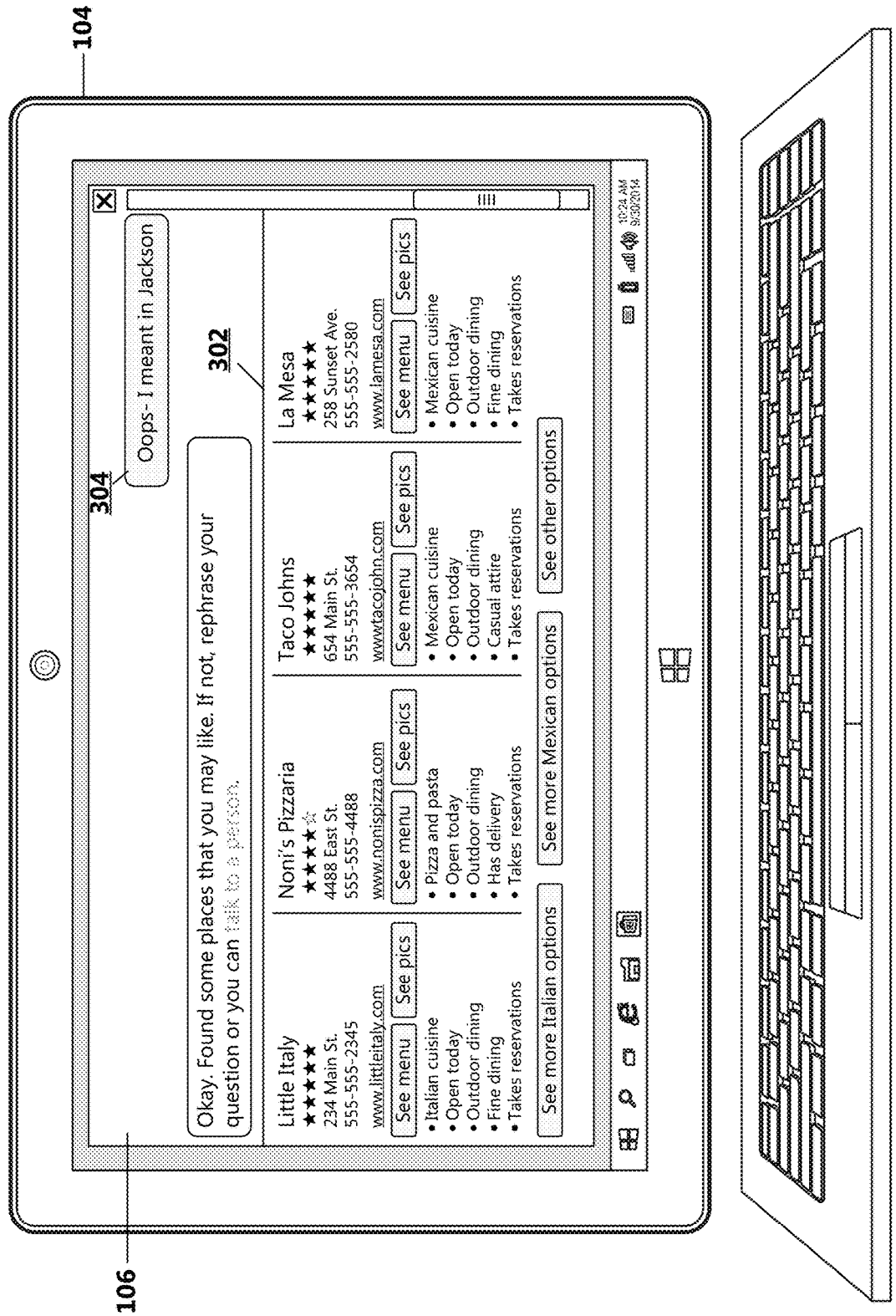

For example, the response 212 may fulfill one or more missing entities 304 in the structured query 202 or may help to clarify the user's intent, and based on the user's response, the dialog manager 112 is able to filter the results to one or more relevant documents 120 meeting a certain threshold, and deliver the results 302 to the user 102. With reference now to FIG. 4B, the user 102 provides a follow-up response 304 "Oops—I meant in Jackson." Accordingly, responsive to the follow-up response 304, the dialog manager 112 determines that the follow-up response 304 includes an entity 204 that is an edit to a previously-fulfilled entity 204, and edits the entity 204 in the structured query 202 for determining and providing search results 302 that are responsive to the edited query 202 as illustrated in FIG. 4C. As should be appreciated, the above examples are not meant to be limiting. Other scenarios are possible and are within the scope of the present disclosure.

Figure 5A:
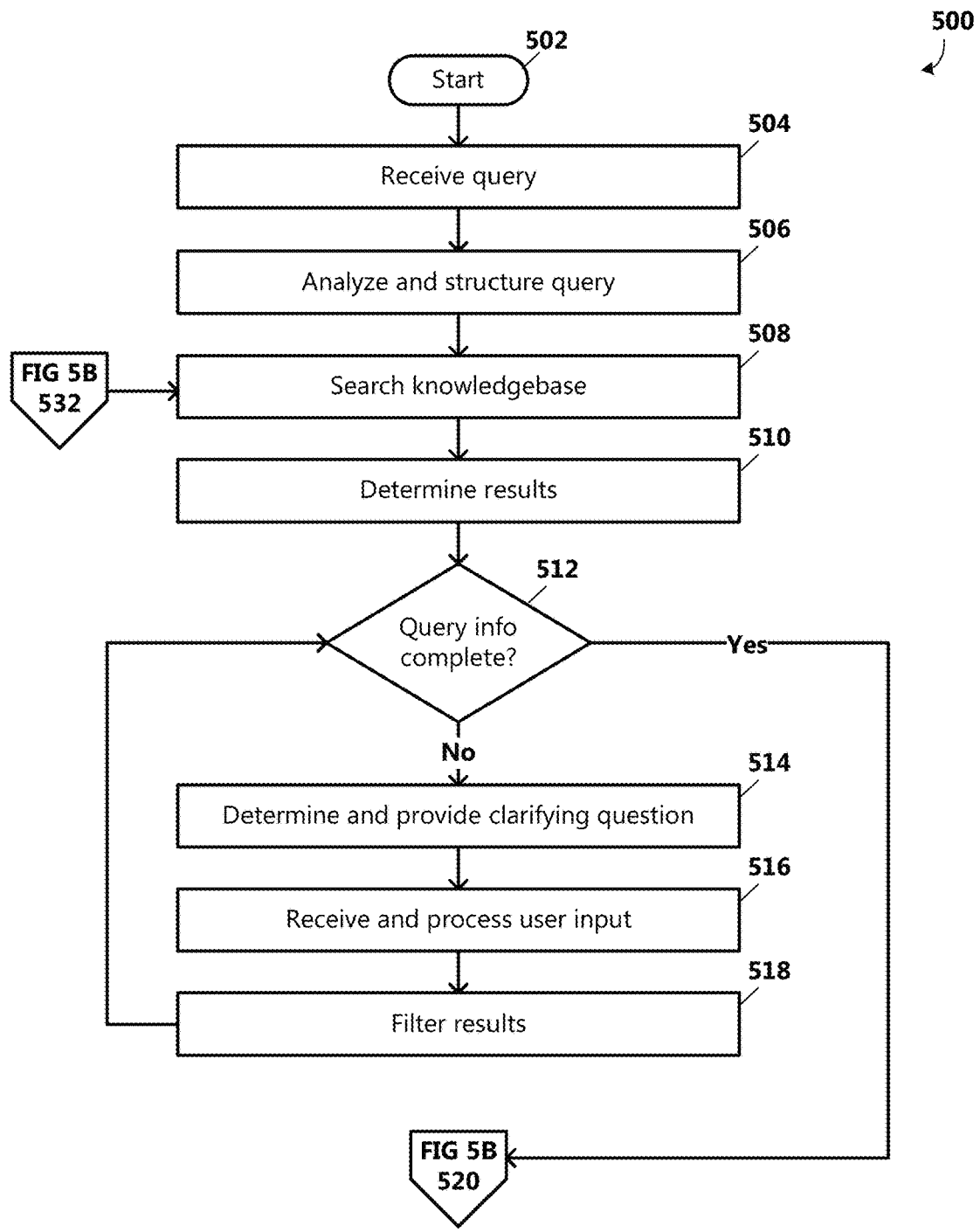
FIGS. 5A-B are a flowchart showing general stages involved in an example method of providing conversational virtual assistance for delivering relevant query solutions.
Figure 5B:
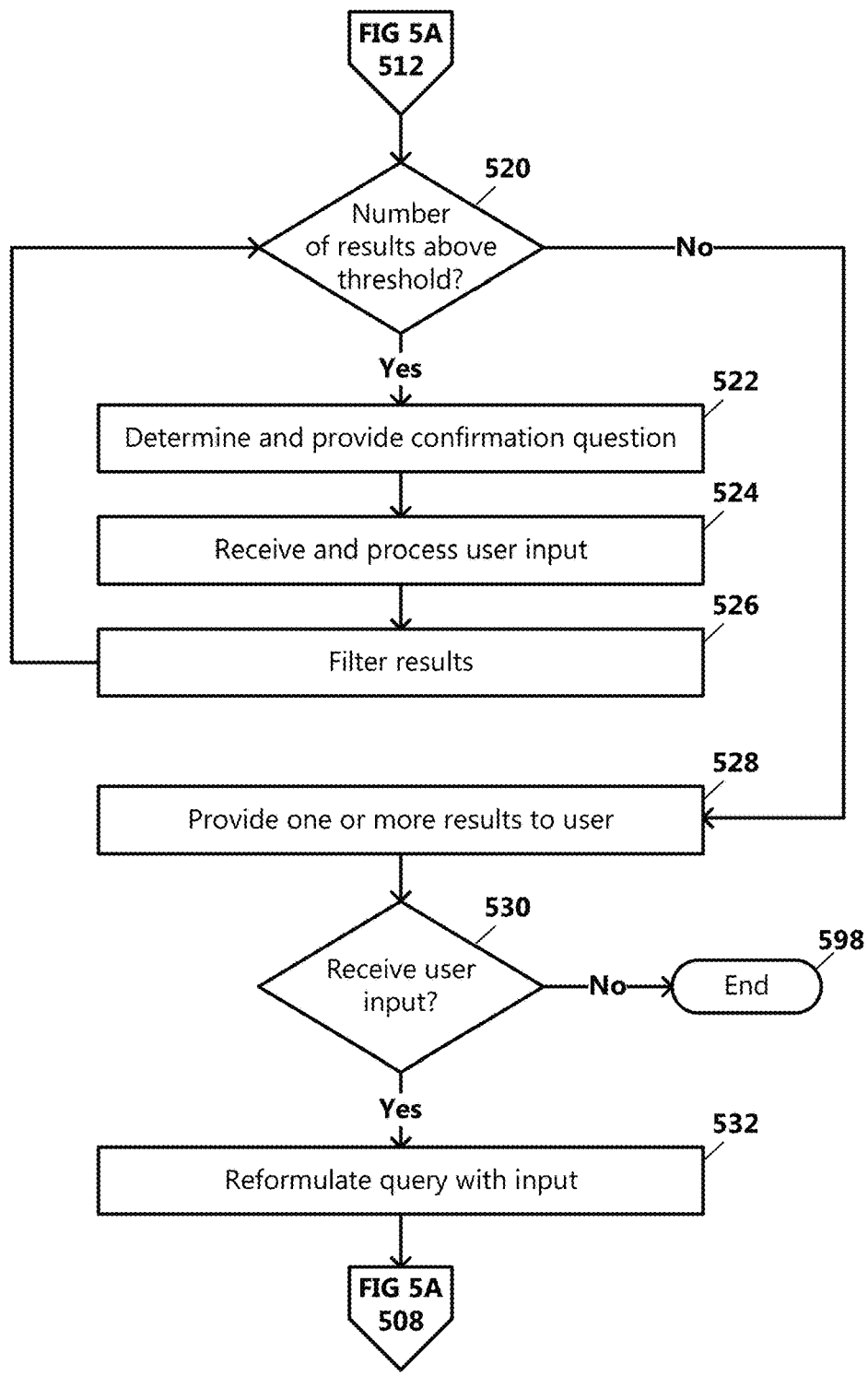

Having described an operating environment 100, components of the virtual assistant system 108, and various use case examples with respect to FIGS. 1-4C, FIGS. 5A-B illustrate a flow chart showing general stages involved in an example method 500 for providing conversational virtual assistance. With reference now to FIG. 5A, the method 500 begins at START OPERATION 502, and proceeds to OPERATION 504, where a query 202 is received via one of various types of communication channels. According to an aspect, the query 202 is a request for information.

Upon receiving the query 202, the method 500 continues to OPERATION 506, where the query and document structurer 114 analyzes and structures the query 202, identifies and extracts entities 204, and maps identified entities 204 to vectors.

The method 500 proceeds to OPERATION 508, where the search engine 116 performs a search of the knowledge database 110 for mapping vectors corresponding to identified entities 204 in the structured query 202 to vectors of identified entities 204 from a corpus of documents 120. For example, the knowledge database 110 includes structured documents 120 with corresponding vectors, wherein the structured documents 120 have been previously analyzed for entities 204, and where the structured documents 120 have been mapped to vectors.

At OPERATION 510, a candidate pool 206 of search results is generated comprising documents 120 responsive to the query 202 and that satisfy a certain confidence score threshold. According to an aspect, search results are determined by mapping vectors between entities 204 in the query 202 and entities in a document 120, and where the mapping meets a calculated degree of similarity between the vectors.

The method 500 proceeds to DECISION OPERATION 512, where a determination is made as to whether enough query entities 204 are provided for determining one or more relevant solutions for the user 102. When a determination is made that the query 202 is not complete enough, the method 500 proceeds to OPERATION 514, where the dialog manager 112 formulates a clarifying question 210, and delivers the question to the user 102. At OPERATION 516, a response 212 from the user 102 is received and processed. For example, the response 212 is processed for identifying and extracting one or more entities 204 that can supplement the query 202.

The method 500 proceeds to OPERATION 518, where the one or more entities 204 are applied to the structured query 202, and the confidence score 208 of each document 120 is adjusted accordingly. The method 500 returns to DECISION OPERATION 512. When a determination is made that the query information is complete, the method 500 proceeds to DECISION OPERATION 520 on FIG. 5B, where a determination is made as to whether the number of results in the candidate pool 206 exceed a certain threshold value.

When a determination is made that the number of results exceeds the threshold value, the method 500 proceeds to OPERATION 522, where the dialog manager 112 formulates a confirmation question 210, and delivers the question to the user 102. For example, the confirmation question 210 may be formulated to clarify the user's intent. At OPERATION 524, a response 212 from the user 102 is received and processed. For example, the response 212 is processed for identifying and extracting one or more entities 204 that can supplement the query 202.

The method 500 proceeds to OPERATION 526, where the one or more entities 204 are applied to the structured query 202, and the confidence score 208 of each document 120 is adjusted accordingly. The method 500 returns to DECISION OPERATION 520. When a determination is made that the number of results in the candidate pool 206 do not exceed a certain threshold value, the method 500 proceeds to OPERATION 528, where one or more results are 302 are delivered to the user 102.

The method 500 continues to DECISION OPERATION 530, where a determination is made as to whether a follow-up response 304 is received. When a determination is made that a follow-up response 304 is not received, the method 500 ends at OPERATION 598. When a determination is made that a follow-up response 304 is received, the dialog manager 112 processes the response for identifying and extracting one or more entities 204, determines whether the one or more entities 204 are edits to previously-fulfilled entities 204, and edits the one or more entities 204 in the structured query 202 for determining and providing search results 302 that are responsive to the edited query 202. The method 500 then returns to OPERATION 508 on FIG. 5A.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
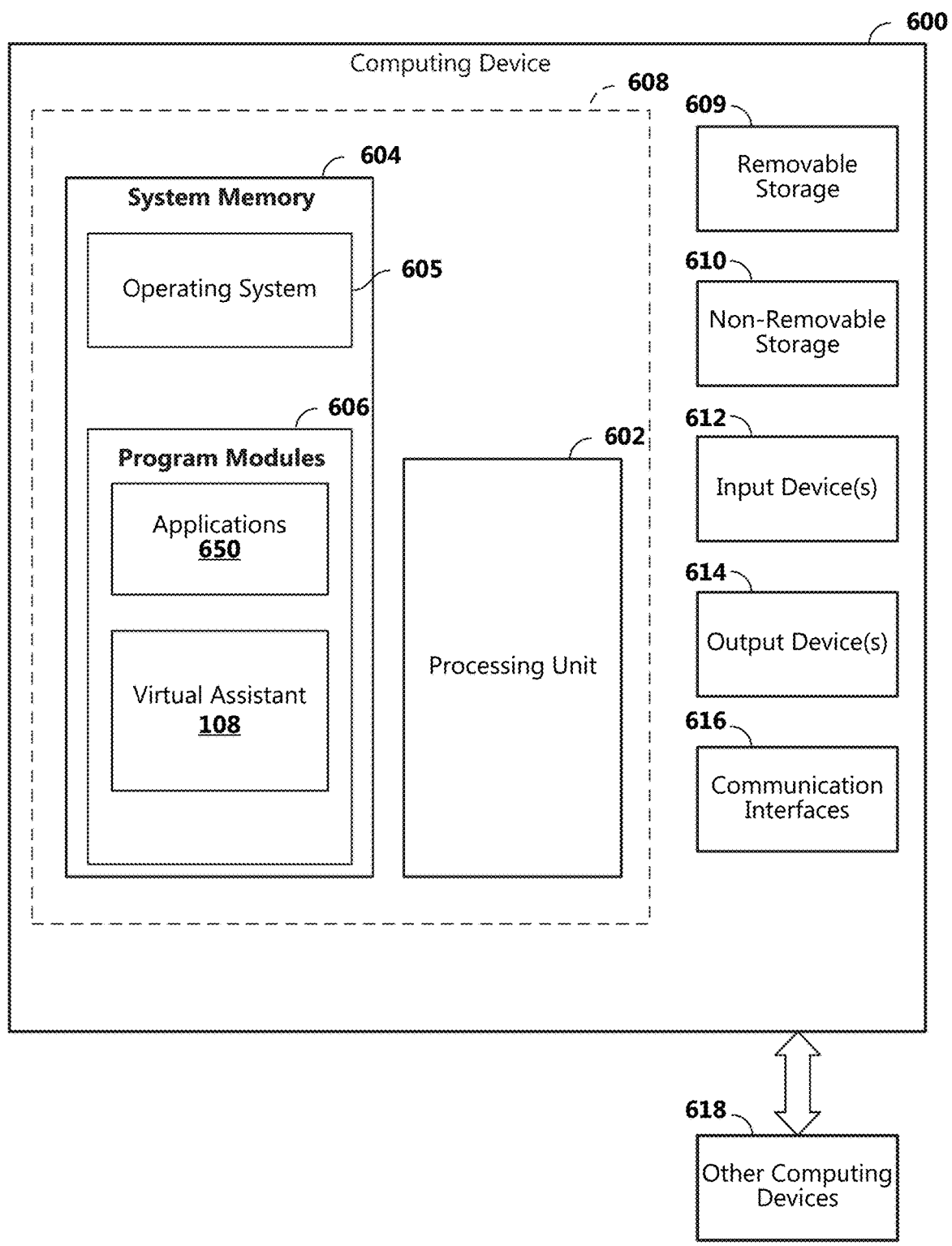
FIG. 6 is a block diagram illustrating physical components of a computing device with which examples may be practiced.
Figure 7A:
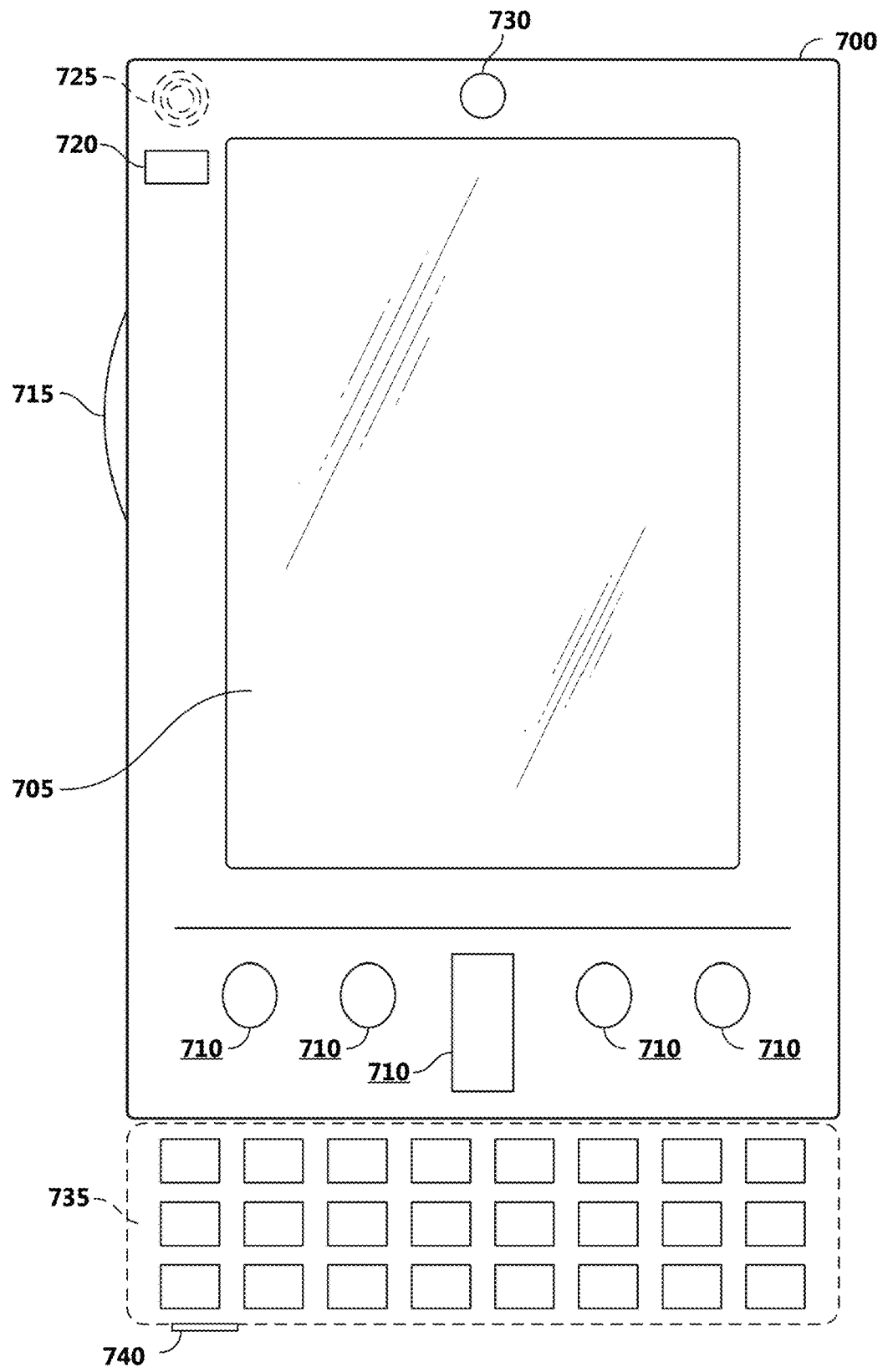
FIGS. 7A and 7B are block diagrams of a mobile computing device with which aspects may be practiced.
Figure 7B:
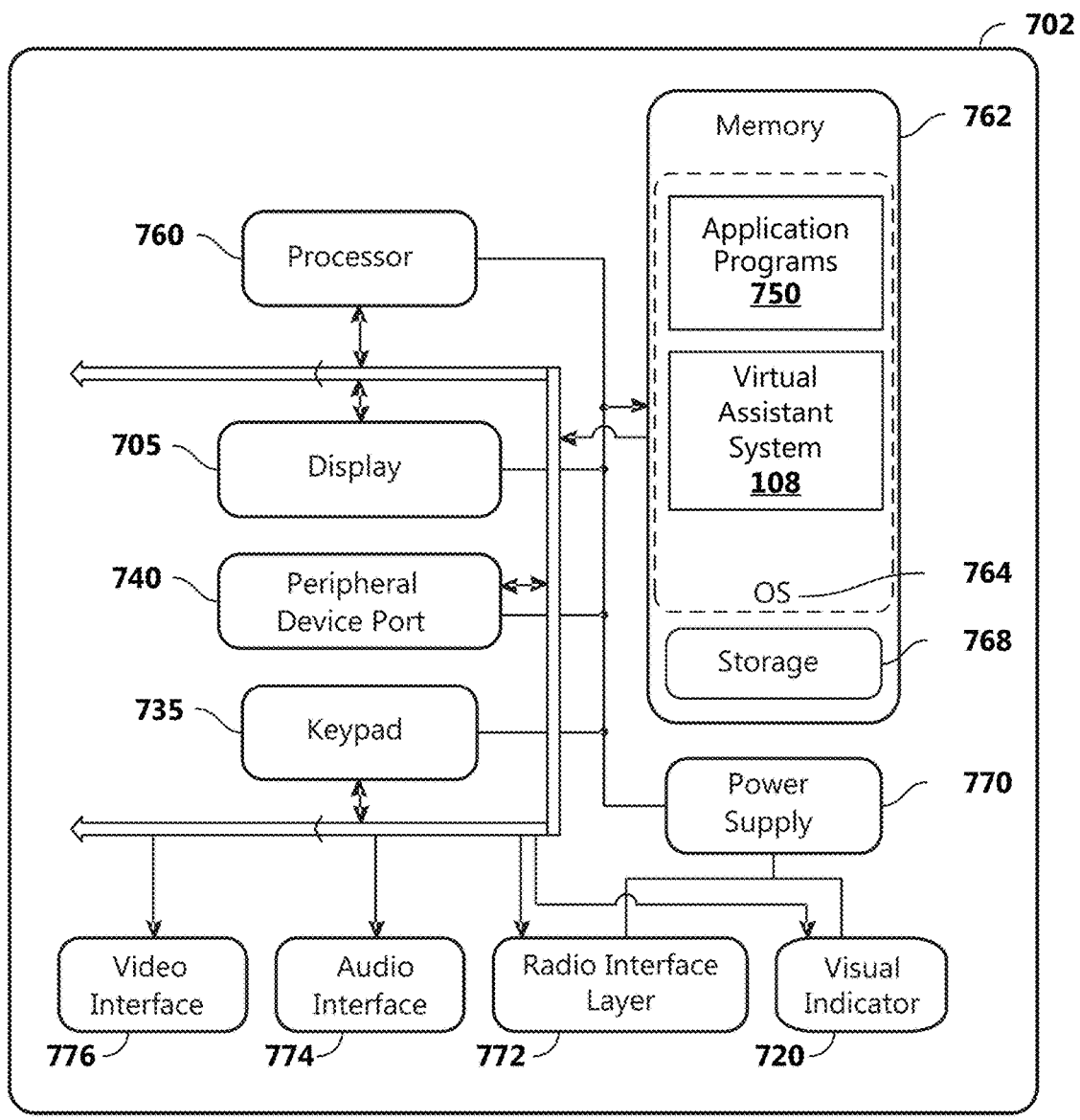
Figure 8:
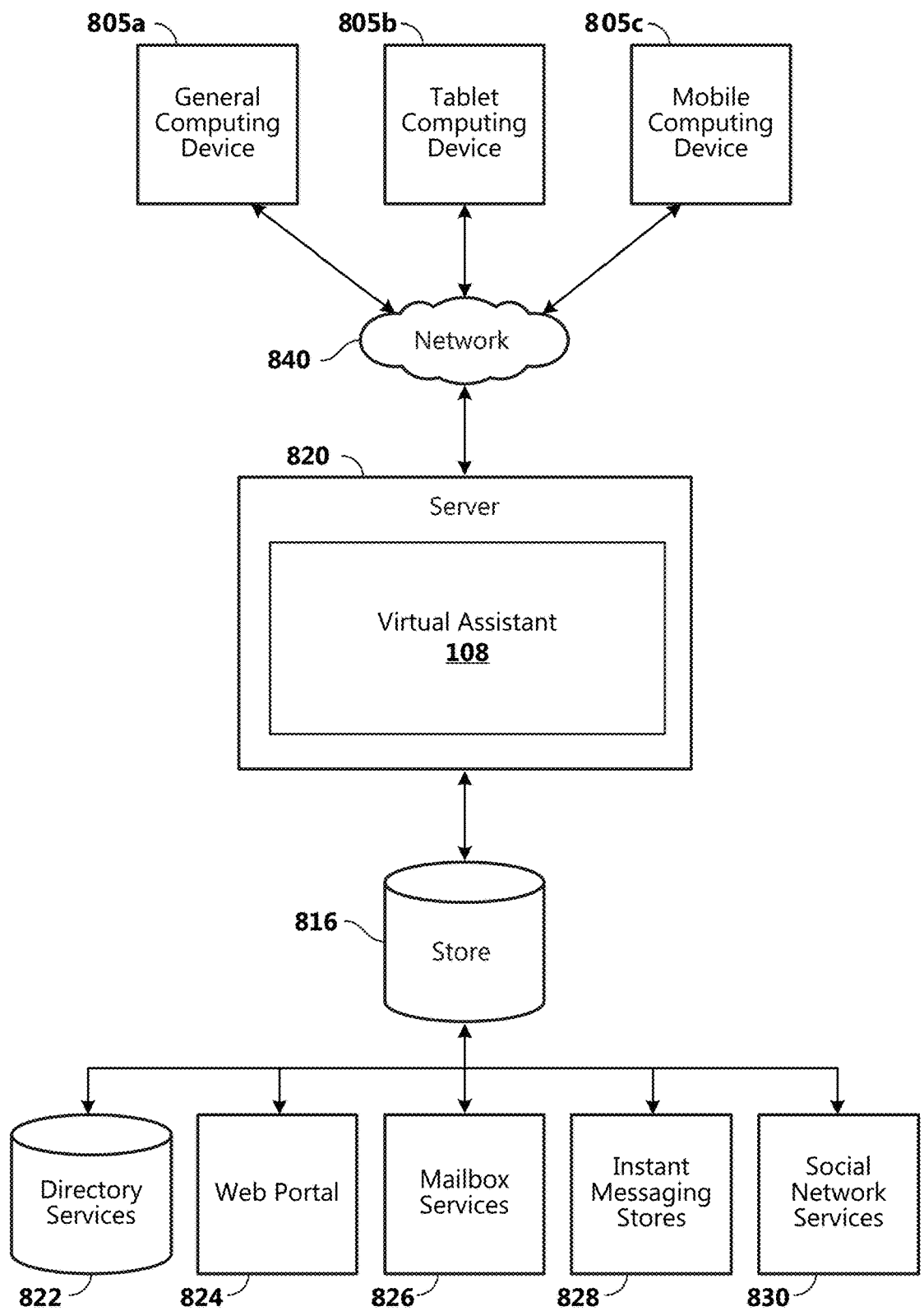
FIG. 8 is a block diagram of a distributed computing system in which aspects may be practiced.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure are be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the virtual assistant system 108. The operating system 605, for example, is suitable for controlling the operation of the computing device 600. Furthermore, aspects are practiced in conjunction with a graphics library, other operating systems, or any other application program, and is not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., virtual assistant system 108) perform processes including, but not limited to, one or more of the stages of the method 500 illustrated in FIGS. 5A and 5B. According to an aspect, other program modules are used in accordance with examples and include applications such as electronic mail and contacts applications, word processing applications, spreadsheet applications, database applications, slide presentation applications, drawing or computer-aided drafting application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the virtual assistant system 108 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for providing conversational virtual assistance as described above. Content developed, interacted with, or edited in association with the virtual assistant system 108 is enabled to be stored in different communication channels or other storage types. For example, various documents may be stored using a directory service 822, a web portal 824, a mailbox service 826, an instant messaging store 828, or a social networking site 830. The virtual assistant system 108 is operative to use any of these types of systems or the like for providing conversational virtual assistance, as described herein. According to an aspect, a server 820 provides the virtual assistant system 108 to clients 805a,b,c. As one example, the server 820 is a web server providing the virtual assistant system 108 over the web. The server 820 provides the virtual assistant system 108 over the web to clients 805 through a network 840. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing a relevant solution to a user query, comprising:
   receiving a communication from a user via a communication channel, wherein the communication comprises an unstructured query for information;

structuring the query into a defined format;
identifying a set of entities in the structured query, wherein the set of entities at least in part define the user's intent;
searching a knowledge database for documents that fulfill the user's intent based at least in part on matching one or more entities in the set of identified entities in the structured query to one or more entities identified in each document;
generating a candidate pool comprising the documents, wherein each document has an associated confidence score based on matched entities;
determining whether to apply a conversation strategy based at least in part on an identification of at least one document entity missing in the structured query; and
when a determination is made to apply the conversation strategy:
   formulating a question to ask the user for satisfying the at least one missing query entity;
   providing the question to the user via the communication channel;
   receiving a response to the question via the communication channel, wherein the response satisfies at least one missing entity;
   matching the at least one satisfied entity to one or more entities identified in the documents in the candidate pool;
   adjusting the confidence scores associated with the documents based on matched entities;
   determining whether to apply a second conversation strategy based at least in part on whether one or more documents have an associated confidence score that satisfies a certain threshold; and
   when a determination is made to not apply the second conversation strategy, presenting one or more documents having an associated confidence score that satisfies the certain threshold to the user via the communication channel.

2. The method of claim 1, further comprising:
receiving a follow-up response from the user, wherein the follow-up response comprises an edit to an entity of the one or more entities in the set of identified entities in the structured query;
searching the knowledge database for documents that fulfill the user's intent based at least in part on matching one or more entities in the set of identified entities in the structured query, the one or more entities including the edited entity, to one or more entities identified in each document;
generating a candidate pool comprising the documents, wherein each document has an associated confidence score based on matched entities; and
presenting one or more documents having an associated confidence score that satisfies the certain threshold to the user via the communication channel.

3. The method of claim 1, wherein identifying the set of entities in the structured query further comprises mapping each entity to a vector.

4. The method of claim 3, wherein searching the knowledge database for documents that fulfill the user's intent comprises matching one or more vectors associated with the identified set of entities in the structured query to one or more vectors associated with the identified entities in one or more documents, wherein the matching is based at least in part on a calculated degree of similarity between the vectors.

5. The method of claim 4, wherein the matching is based at least on cosign similarity.

6. The method of claim 1, wherein prior to receiving the communication from the user, generating the knowledge database, comprising:
accessing a document;
structuring the document into a defined format;
identifying an entity in the document; and
storing the identified entity in association with the document in the knowledge database.

7. The method of claim 6, further comprising;
mapping the identified entity to a vector; and
storing the vector in the knowledge database in associated with the corresponding document.

8. The method of claim 1, wherein formulating the question to ask the user for satisfying the at least one missing entity comprises formulating a question relating to the document in the candidate pool having a highest confidence score.

9. The method of claim 1, wherein formulating the question to ask the user for satisfying the at least one missing entity comprises formulating a question relating to an entity that is associated with median number of documents in the candidate pool for optimizing a split difference of the candidate pool.

10. The method of claim 1, wherein when a determination is made to apply the second conversation strategy:
formulating a question to ask the user for reducing a number of documents that have an associated confidence score satisfying the certain threshold;
providing the question to the user via the communication channel;
receiving a response to the question via the communication channel, the response including at least one entity;
matching the at least one entity to one or more entities identified in the documents in the candidate pool;
adjusting the confidence scores associated with the documents based on matched entities; and
determining whether to apply a third conversation strategy based at least in part on whether one or more documents have an associated confidence score that satisfies the certain threshold.

11. The method of claim 1, further comprising:
concatenating communications from the user, including follow-up responses, into a single string; and
searching the knowledge database for documents that fulfill the user's intent based at least in part on the concatenated string.

12. A system for providing a relevant solution to a user query, comprising:
a processing unit; and
a memory, including computer readable instructions, which when executed by the processing unit is operable to provide an automated agent system operative to:
   receive a communication from a user via a communication channel, wherein the communication comprises an unstructured query for information;
   structure the query into a defined format;
   identify a set of entities in the structured query, wherein the set of entities at least in part define the user's intent;
   search a knowledge database for documents that fulfill the user's intent based at least in part on matching one or more entities in the set of identified entities in the structured query to one or more entities identified in each document;
   generate a candidate pool comprising the documents, wherein each document has an associated confidence score based on matched entities;

determine whether to apply a conversation strategy based at least in part on an identification of at least one document entity missing in the structured query; and when a determination is made to apply the conversation strategy:

formulate a question to ask the user for satisfying the at least one missing query entity;

provide the question to the user via the communication channel;

receive a response to the question via the communication channel, wherein the response satisfies at least one missing query entity;

match the at least one satisfied entity to one or more entities identified in the documents in the candidate pool;

adjust the confidence scores associated with the documents based on matched entities;

determine whether to apply a second conversation strategy based at least in part on whether one or more documents have an associated confidence score that satisfies a certain threshold; and when a determination is made to not apply the second conversation strategy, present one or more documents having an associated confidence score that satisfies the certain threshold to the user via the communication channel.

13. The system of claim 12, wherein the system is further operative to:

receive a follow-up response from the user, wherein the follow-up response comprises an edit to an entity of the one or more entities in the set of identified entities in the structured query;

search the knowledge database for documents that fulfill the user's intent based at least in part on matching one or more entities in the set of identified entities in the structured query, the one or more entities including the edited entity, to one or more entities identified in each document;

generate a candidate pool comprising the documents, wherein each document has an associated confidence score based on matched entities; and present one or more documents having an associated confidence score that satisfies the certain threshold to the user via the communication channel.

14. The system of claim 12, wherein in identifying the set of entities in the structured query, the system is further operative to map each entity to a vector.

15. The system of claim 14, wherein in searching the knowledge database for documents that fulfill the user's intent, the system is operative to match one or more vectors associated with the identified set of entities in the structured query to one or more vectors associated with the identified entities in one or more documents, wherein the matching is based at least in part on a calculated degree of similarity between the vectors.

16. The system of claim 12, wherein prior to receiving the communication from the user, the system is further operative to generate the knowledge database, wherein in generating the knowledge database, the system is operative to:

access a document from a corpus of documents;

structure the document into a defined format;

identify an entity in the document; and store the identified entity in association with the document in the knowledge database.

17. The system of claim 16, wherein the system is further operative to;

map the identified entity to a vector; and store the vector in the knowledge database in associated with the corresponding document.

18. The system of claim 12, wherein in formulating the question to ask the user for satisfying the at least one missing entity, the system is operative to:

formulate a question relating to the document in the candidate pool having a highest confidence score; or formulate a question relating to an entity that is associated with a median number of documents in the candidate pool for optimizing a split difference of the candidate pool.

19. The system of claim 12, wherein the system is further operative to:

concatenate communications from the user, including follow-up responses, into a single string; and search the knowledge database for documents that fulfill the user's intent based at least in part on the concatenated string.

20. A non-volatile computer readable storage medium including computer readable instructions, which when executed by a processing unit is operable to:

receive a communication from a user via a communication channel, wherein the communication comprises an unstructured query for information;

structure the query into a defined format;

identify a set of entities in the structured query, wherein the set of entities at least in part define the user's intent;

search a knowledge database for documents that fulfill the user's intent based at least in part on matching one or more entities in the set of identified entities in the structured query to one or more entities identified in each document;

generate a candidate pool comprising the documents, wherein each document has an associated confidence score based on matched entities;

present one or more documents in the candidate pool having an associated confidence score that satisfies a certain threshold to the user via the communication channel;

receive a follow-up response from the user, wherein the follow-up response comprises an edit to an entity of the one or more entities in the set of identified entities in the structured query;

search the knowledge database for documents that fulfill the user's intent based at least in part on matching one or more entities in the set of identified entities in the structured query, the one or more entities including the edited entity, to one or more entities identified in each document;

generate a candidate pool comprising the documents, wherein each document has an associated confidence score based on matched entities; and present one or more documents having an associated confidence score that satisfies the certain threshold to the user via the communication channel.

* * * * *